J. W. R. ANDREWS.
CHILD'S CARRIAGE.
APPLICATION FILED OCT. 14, 1911.
1,074,583.
Patented Sept. 30, 1913.
2 SHEETS—SHEET 2.
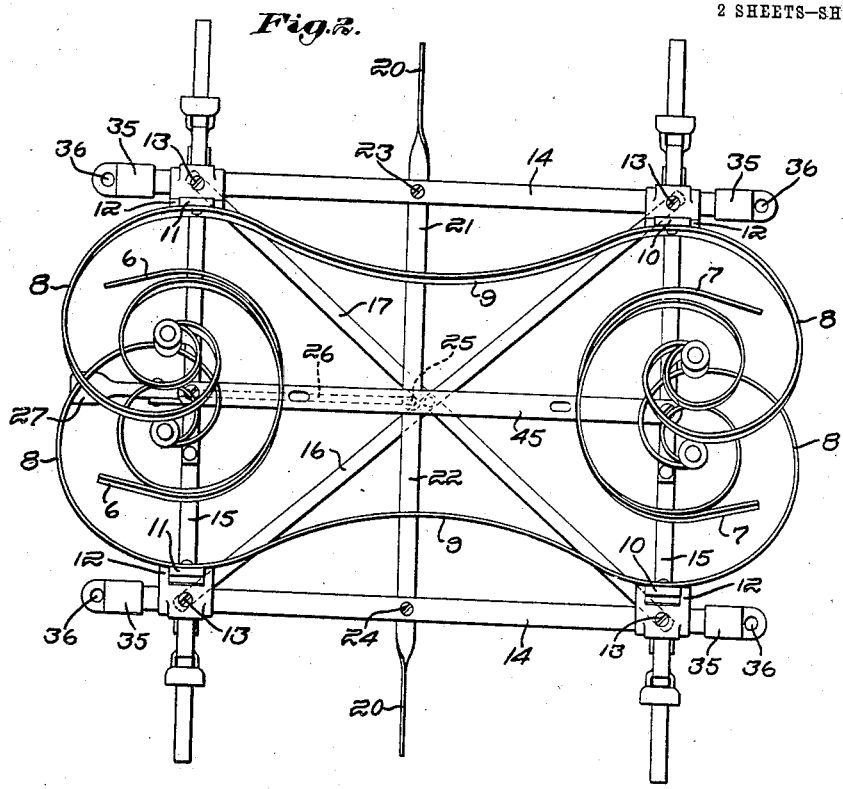
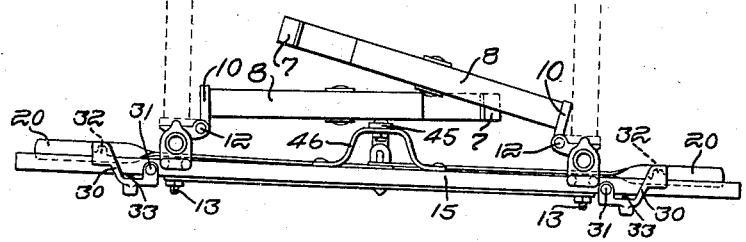
Witnesses:
Carl L. Choate
Horace A. Crossman
Inventor:
John W. R. Andrews,
by Emery, Booth, Janney & Varney
Attys.

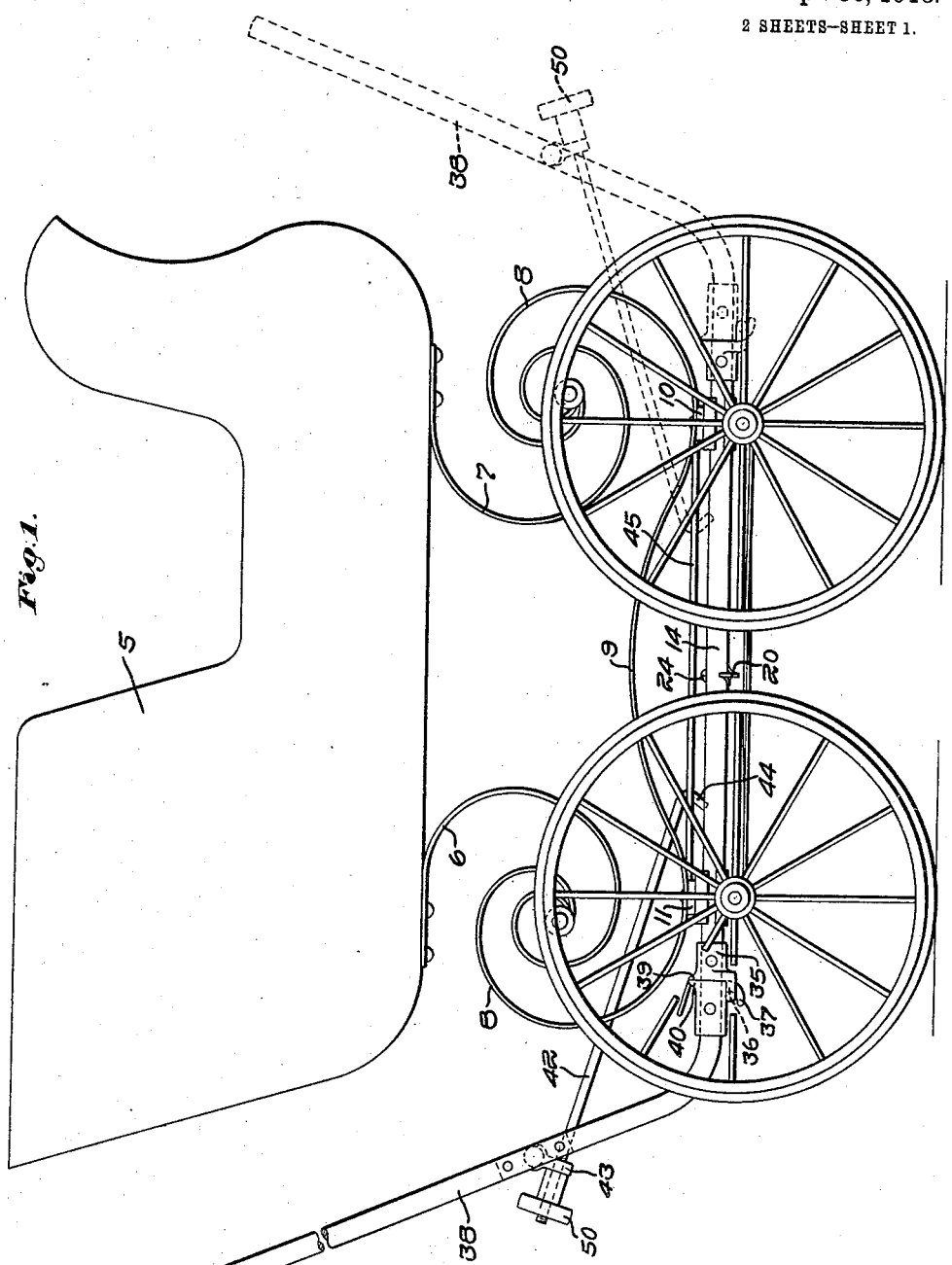

UNITED STATES PATENT OFFICE.

JOHN W. R. ANDREWS, OF LEOMINSTER, MASSACHUSETTS, ASSIGNOR TO F. A. WHITNEY CARRIAGE CO., OF LEOMINSTER, MASSACHUSETTS, A CORPORATION OF MASSACHUSETTS.

CHILD'S CARRIAGE.

1,074,583. Specification of Letters Patent. Patented Sept. 30, 1913.

Application filed October 14, 1911. Serial No. 654,744.

*To all whom it may concern:*

Be it known that I, JOHN W. R. ANDREWS, a citizen of the United States, and a resident of Leominster, county of Worcester, and State of Massachusetts, have invented an Improvement in Children's Carriages, of which the following description, in connection with the accompanying drawings, is a specification, like characters on the drawings representing like parts.

This invention relates to children's carriages and more particularly to a knockdown construction which admits of such carriages being very conveniently and expeditiously taken apart and packed for shipment.

The character of the invention may be readily understood by reference to an illustrative embodiment shown in the accompanying drawings, in which:

Figure 1 is a side elevation of an illustrative type of the carriage embodying the invention; Fig. 2 is a plan view of the collapsed running gear and springs after the body and wheels have been removed; and Fig. 3 is an end elevation of the part shown in Fig. 2, viewed from the right in Fig. 2.

Referring to the drawings, the illustrative carriage has a body 5 which may be of any suitable type and which is conveniently bolted as shown to springs 6 and 7, the springs being of any suitable type and preferably comprising a number of convolutions. As shown, each spring 6 and 7 is secured to a long spring strip 8 having a middle portion 9. Each spring strip 8, 9 is secured to a block 10 preferably arranged in the vertical plane of the axis of one pair of wheels, and also to a block 11 preferably arranged in substantially the vertical plane of the axis of the other pair of wheels. Each of the blocks 10 and 11 constitutes one leaf of a hinge 12 the other leaf of which is secured by a bolt 13 to a longitudinal frame member 14. Each frame member is preferably tubular in form and each of the bolts 13 may extend through its hinged leaf, thence through the tubular frame member 14, and thence through an axial bar 15. Also each bolt 13 may extend through and secure in place one end of a diagonal brace 16 or 17. Thus, the entire structure of the running gear frame is secured in place by four bolts, one in each corner and by the hinges 12, 12 upon which the springs are permitted to be collapsed to the position shown in Fig. 3.

A brake may be provided having brake shoes 20, each mounted upon a lever 21 or 22 fulcrumed respectively on the side bars 14, 14 at 23 and 24. The two levers 21 and 22 are joined at a common pivot 25 to a link rod 26 by which the brake levers are connected to any suitable type of treadle 27.

The axles are provided with wheel engaging clips 30 each pivoted at 31 to the axle bar and having recessed portions 32 to engage annular grooves in the hubs of the wheels. Springs 33 hold the recessed portions 32 normally in engagement with the wheel hubs to permit the clips 30 to be rocked conveniently for withdrawing the wheel. This very convenient manner of securing the wheels removably in place combines excellently with the other features, to produce a construction which may be very easily and rapidly disorganized and collapsed for packing. Likewise, the handles are made removable by having at an end of each side bar 14 the casting 35 pinned to the cross bar and provided with an eye 36 to receive a finger 37 upon a mating casting pinned to the lower end of a handle bar 38. Coöperating toes 39 and 40 on the two castings contribute to extend the bearing surface between the two and to increase the stability of the joint. The two castings are held in mating relation by a link 42 which passes through a lug 43 fixed upon a cross piece connecting the handle bars. A hooked end 44 of the link 42 engages in a hole of a strip 45 mounted upon brackets 46 secured to the axle bars 15. One end of the link 42 is threaded to receive a head 50 by which the link may be shortened to bring the castings 35 and 37 into proper relation and to hold them, if desired, under tension.

The parts just described to provide the readily removable handle may be duplicated at both ends of the vehicle as indicated in dotted lines at the right of Fig. 1, thus permitting the handle to be placed on either end of the vehicle.

The vehicle, as shown in Figs. 2 and 3, may be very readily set up by merely slipping the wheels onto the axles and engaging their grooved hubs by the clips 30. Thereupon the springs 7, 8, 9, may be moved into upright position and the body bolted in place to the free ends of the springs 6 and 7. Then the handle bars may be applied at either end by merely inserting each of the two hooks 37 into its eye 36, engaging the hooked end of the link 42 with its hole or seat in the strip 45, and then screwing up the nut 50. The hinges 12, 12 and their respective blocks 10 and 11, are preferably so arranged that when the springs are rocked and the body bolted thereto, the hinges will be held tightly closed and under tension so as to prevent all rattling or looseness. Likewise, the handles are preferred to be put under tension by screwing up the nut 50.

Thus, an embodiment of all the features of the invention comprises parts which, when assembled, are very stable and held rigidly together, and they may be readily disorganized and collapsed by merely withdrawing the bolts which secure the body to the springs and then slightly unscrewing the nut 50 and removing the wheels as described. Thus, the only separate parts required are the body bolts for securing the body to the springs, all the other parts being preferably connected in substantially permanent organization so that in transit they are not readily separated and lost.

It is to be understood that the invention is not limited to the specific disclosure above described, since it is susceptible of considerable modification in construction and mode of operation, as will appear to those skilled in the art.

Claims—

1. A knock-down children's carriage comprising, in combination, a substantially rigid running gear frame having longitudinal bars connected by transverse axle bars; clips upon the axle bars removably engaging the wheel hubs; diagonal braces for the running gear frame; hinges at the four corners of the running gear frame; a bolt traversing a leaf of each hinge, a longitudinal bar of the frame, an axle bar, and a diagonal brace; springs secured to the free leaves of the hinges a casting having an eye, secured to an end of each longitudinal bar; handle bars having hooks to engage said eyes; and a link carried by the handle bars, having a hooked end; and means mounted upon the running gear frame to receive the hook of said link.

2. A knock-down children's carriage comprising, in combination, a substantially rigid running gear frame having longitudinal bars connected by transverse axle bars; clips upon the axle bars removably engaging the wheel hubs; hinges at the four corners of the running gear frame; a bolt traversing a leaf of each hinge, a longitudinal bar of the frame, and an axle bar; springs secured to the free leaves of the hinges; and handle bars removably attached to the frame.

3. A knock-down children's carriage comprising, in combination, a substantially rigid running gear frame having longitudinal bars connected by transverse axle bars; hinges at the four corners of the running gear frame; a bolt traversing a leaf of each hinge, a longitudinal bar of the frame, and an axle bar; and springs secured to the free leaves of the hinges.

In testimony whereof, I have signed my name to this specification, in the presence of two subscribing witnesses.

JOHN W. R. ANDREWS.

Witnesses:
H. S. AFFLECK,
M. BUCKLEY.

Copies of this patent may be obtained for five cents each, by addressing the "Commissioner of Patents, Washington, D. C."